March 5, 1929.  I. D. GREENE  1,704,473
TORCH SUPPORT
Filed Oct. 20, 1927

I. D. GREENE   INVENTOR.
BY
Merrill M. Blackburn
ATTORNEYS.

Patented Mar. 5, 1929.

1,704,473

UNITED STATES PATENT OFFICE.

IRL D. GREENE, OF DAVENPORT, IOWA.

TORCH SUPPORT.

Application filed October 20, 1927. Serial No. 227,513.

In the use of oxy-hydrogen and oxy-acetylene torches and the like, it is desirable to be able to maintain the torch at a fixed distance from the surface which is to be treated. It is also desirable to be able to direct the torch into the angle between two members arranged at a right angle or otherwise. In torch supports heretofore constructed, which are attached to the head of the torch, it is impossible to get the flame near a plate which is arranged at a substantial angle to the plate which is to be heated. The principal object, therefore, of my invention is to provide a support for torches of the general type referred to above, such that the torch can be supported at a fixed distance from the plate which is to be heated and the flame from the torch can be directed to any part of said plate. Among the further objects of my invention are to provide a support of the character indicated which can be readily moved in any direction upon the body upon which the support rests; to provide a generally improved support for the purpose indicated; to provide a support of the character described which can be manufactured at a minimum of cost; and such further objects, advantages and capabilities as will hereafter appear and as are inherent in the construction disclosed.
My invention further resides in the combination, construction and arrangement of parts illustrated in the accompanying drawing and, while I have shown therein what is now considered the preferred form of my invention, I desire it understood that this drawing is to be interpreted as illustrative only and not in a limiting sense.

Figure 1:
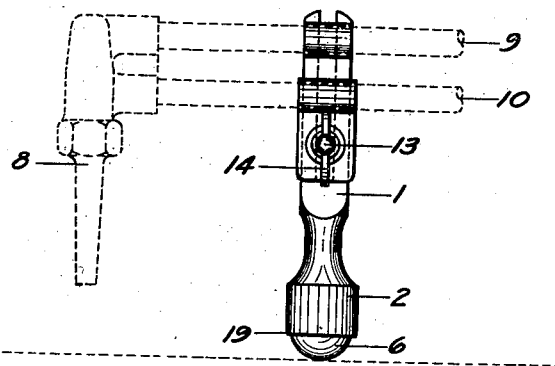
Figure 2:
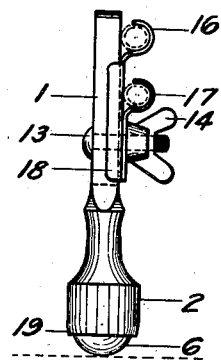
Figure 3:
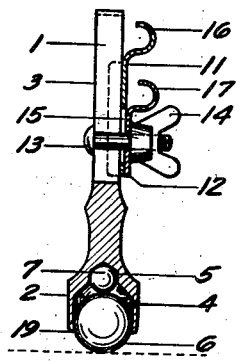
Figure 4:
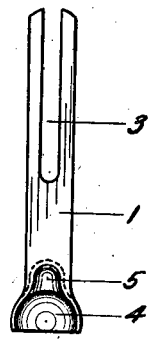
Figure 5:
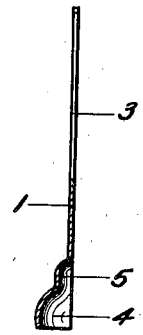
Figure 6:
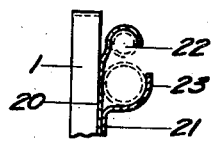
Figure 7:
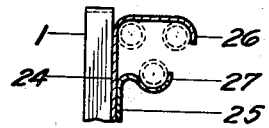

In the drawing annexed hereto and forming a part hereof, Fig. 1 shows in dotted outline a portion of a torch of the character referred to and in solid lines an elevation of one form of my improved construction; Fig. 2 shows a view at a right angle to Fig. 1; Fig. 3 is a longitudinal substantially central section thru the construction shown in Figs. 1 and 2; Fig. 4 is a face view of one element of a modified construction formed from sheet metal; Fig. 5 is a longitudinal central section thru the construction shown in Fig. 4; Fig. 6 is a longitudinal section thru one end of a support showing a modified form of clamping element to be used in conjunction with a different style of torch; Fig. 7 is a similar view of another modification.
Referring more in detail to the annexed drawing, and more particularly to Figs. 1, 2 and 3, my device is shown as comprising a shank 1 and a head 2, the former being slotted as shown at 3 and the latter being provided with a pair of co-axial sockets 4 and 5 in which are located balls 6 and 7, the purpose of which is to reduce the amount of friction encountered when this device is moved over a surface upon which the torch 8 is being used. In order to clamp the device to the feed pipes 9 and 10 of the torch, a pair of clamps 11 and 12 are provided which are secured to the slotted shank 1 by means of the bolt 13, which is preferably provided with a wingnut 14 for clamping purposes. In the clamping plate 11 is a slot 15 by means of which the space between the hooks 16 and 17 may be adjusted when the distance between the pipes 9 and 10 varies. Preferably the plate 11 is provided along its edges with flanges 18 to prevent the same from rotating relatively to the shank 1. In order to prevent the balls 6 and 7 from dropping out of the sockets, the edge of the head 2 is crimped in slightly so that the opening is slightly less than the diameter of the ball 6. This will hold the ball in place and yet allow sufficient space so that it can turn freely.

Various other forms of construction are contemplated, one of which is shown in Figs. 4 and 5. In this form of construction, a plate of sheet metal is stamped in appropriate form and then die-pressed to form the sockets 4 and 5 in which the balls 6 and 7 are placed. In this form of construction, two identical members are put together with the balls in place therein and the slots 3 registering. These members may then be secured together in any suitable way such as by means of rivets or by spot welding them, preferably the latter. Another modification of this is to have one member of the form shown in Fig. 4 and another one of a length such that its upper end will not reach the slot 3. With such a construction the balls are placed in the sockets 4 and 5 and then the sheet metal is electrically welded. In this construction, if desired, the parts of the shank on opposite sides of the slot 3 may be made of heavier metal or the edges of the metal may be folded over to form these shanks of double thickness, in order to get the desired rigidity. Any one of several forms of clamps may be used to fasten this device to the torch tubes as indicated in connection with Figs. 1, 2 and 3. The form used will of course depend upon the number and arrangement of the feed pipes 9 and 10 of the torch. In Figs. 6 and 7 I have illustrated two different styles of clamps, the plates 20 and 21 in Fig. 6 being provided with the hooks 22 and 23, while the plates 24 and 25 in Fig. 7 are provided with the hooks 26 and 27. The necessity for these various shapes of clamping members will be obvious when it is considered that different makes of torches have different numbers, sizes and arrangements of pipes.

While I have shown and described certain forms of device coming within the scope of my invention, I have conceived various other forms of execution thereof and therefore desire that my claims shall not be construed as limited to the forms herein disclosed.

Having now described my invention, I claim:

1. In a torch support, a socketed body having antifriction balls in the socket, and a shank on said body adapted to be secured to the torch in position to permit the torch to be operated closely within an angle and support the torch at a fixed distance from the surface being treated, in combination with a plurality of clamping members, hook shaped at one end to engage the tubes of a torch and perforated at their opposite end for the reception of holding means whereby the clamping members are adjustably secured to the shank.

2. A support for a right angled torch, comprising a supporting member having a shank and an aperture therein for reception of means whereby a clamp may be attached to the torch, and a clamp comprising a plurality of relatively movable hook shaped members for engagement with the torch tube or tubes to hold the support rigid with relation to the torch.

3. A support for a right angled torch, comprising a supporting member having a shank provided with an aperture for reception of means whereby a clamp may be attached to the torch, and a clamp comprising a plurality of relatively slidable hook shaped members for engagement with the torch tube or tubes to hold the support rigid with relation to the torch.

4. A support for a right angled, plural tube torch, comprising a body having a slotted shank, a pair of hook shaped members for engagement with the tubes of the torch, said members being apertured for reception of means whereby they are secured to the shank, and securing means fastening the hook shaped members to the shank in relatively adjustable relation with respect to each other and to the shank.

5. In a torch support having a hollow head and balls in the hollow of the head, a longitudinally slotted shank, clamping elements perforated at one end and provided with hooks at their other ends, and securing means extending through the shank slot and the clamp perforations, said securing means permitting relative adjustment of the aforesaid members.

6. A torch support having a longitudinally slotted shank, clamping elements perforated at one end and provided with hooks at their other ends, and securing means extending through the shank slot and the clamp perforations, said securing means permitting relative adjustment of the aforesaid members, one of said clamping elements having flanges along its lateral edges to prevent rotation thereof with relation to the shank.

In witness whereof, I hereunto subscribe my name to this specification.

I. D. GREENE.